(12) United States Patent
Lee et al.

(10) Patent No.: US 11,603,102 B2
(45) Date of Patent: Mar. 14, 2023

(54) EFFICIENT AND ROBUST METHODOLOGY FOR TRACTION CONTROL SYSTEM

(71) Applicant: GM GLOBAL TECHNOLOGY OPERATIONS LLC, Detroit, MI (US)

(72) Inventors: Joonho Lee, Troy, MI (US); Jason S. Rhee, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

(21) Appl. No.: 17/135,376

(22) Filed: Dec. 28, 2020

(65) Prior Publication Data

US 2022/0203994 A1  Jun. 30, 2022

(51) Int. Cl.
| | | |
|---|---|---|
| *B60W 30/18* | (2012.01) | |
| *B60W 40/12* | (2012.01) | |
| *B60W 10/18* | (2012.01) | |
| *B60W 10/08* | (2006.01) | |
| *B60W 50/00* | (2006.01) | |

(52) U.S. Cl.
CPC ...... *B60W 30/18172* (2013.01); *B60W 10/08* (2013.01); *B60W 10/18* (2013.01); *B60W 40/12* (2013.01); *B60W 2050/0022* (2013.01); *B60W 2510/12* (2013.01); *B60W 2520/28* (2013.01); *B60W 2710/083* (2013.01)

(58) Field of Classification Search
CPC .......... B60W 30/18172; B60W 10/08; B60W 10/18; B60W 40/12; B60W 2050/0022; B60W 2510/12; B60W 2520/28; B60W 2710/083; B60K 28/16; B60T 8/175
See application file for complete search history.

(56) References Cited

U.S. PATENT DOCUMENTS

| | | | |
|---|---|---|---|
| 2017/0043786 A1* | 2/2017 | Mangette | B66F 9/07568 |
| 2021/0114457 A1* | 4/2021 | Eberl | B60K 28/16 |

OTHER PUBLICATIONS

D. Bohl, N. Kariotoglou, A. B. Hempel, P. J. Goulart and J. Lygeros, "Model-based current limiting for traction control of an electric four-wheel drive race car," 2014 European Control Conference (ECC), 2014, pp. 1981-1986, doi: 10.1109/ECC.2014.6862532. (Year: 2014).*

* cited by examiner

*Primary Examiner* — Marthe Y Marc-Coleman
(74) *Attorney, Agent, or Firm* — Cantor Colburn LLP

(57) ABSTRACT

A vehicle includes a system and method of modeling and controlling a traction of a wheel of the vehicle. The system includes an observer, a predictive controller and an online solver. The observer receives a dynamic model parameter of the wheel and determines an estimate of a wheel velocity and an uncertainty in the wheel velocity using a non-linear model of the wheel. The predictive controller determines an average gain and differential gain from the estimate of the wheel velocity and the uncertainty in the wheel velocity. The online solver calculates a motor torque and a wheel brake torque for increasing the traction of the wheel with a road based on the average gain and the differential gain. The motor torque and the wheel brake torque are applied at the vehicle.

20 Claims, 9 Drawing Sheets

EFFICIENT AND ROBUST METHODOLOGY FOR TRACTION CONTROL SYSTEM

INTRODUCTION

The subject disclosure relates to a nonlinear dynamic model for a traction control system and, in particular, to a method of controlling wheel slippage using the non-linear dynamic model to capture non-linear dynamic forces on a wheel and a nonlinear behavior of the wheel.

A vehicle's longitudinal or forward motion is created by rotating a wheel of the vehicle that is in contact with the ground and depends on frictional forces between the wheel and the ground. In some instances, forces or torques applied to the wheel cause a slippage between the wheel and the ground, known as wheel slip. Such slippage allows the wheel to rotate rapidly with little or no corresponding longitudinal motion of the vehicle. A traction control system is therefore often used to control the forces and torques, or traction control forces, on the wheel in order to increase traction of the wheel and reduce wheel slippage. Current traction control systems however calculate traction control forces using only an analysis of the wheel as a linear system. Considering only linear forces on the wheel does not provide a complete picture of the dynamics of the wheel and thus the resulting traction control forces are only partially effective in reducing wheel slippage. Accordingly, it is desirable to provide a traction control system for a wheel that calculates traction control forces based on non-linear forces and/or parameters of the wheel.

SUMMARY

In one exemplary embodiment, a method of modeling and controlling a traction of a wheel of a vehicle is disclosed. A dynamic model parameter of the wheel is received at an observer. An estimate of a wheel velocity and an uncertainty in the wheel velocity is determined at the observer using a non-linear model of the wheel. An average gain and a differential gain are determined at a predictive controller from the estimate of the wheel velocity and the uncertainty in the wheel velocity. A motor torque and a wheel brake torque for increasing the traction of the wheel with a road is calculated based on the average gain and the differential gain. The motor torque and the wheel brake torque are applied at the vehicle.

In addition to one or more of the features described herein, the wheel brake torque includes a right front brake torque and a left front brake torque. The estimate of the wheel velocity and the uncertainty in the wheel velocity includes an estimate of an average wheel velocity, an estimate of a differential wheel velocity, an uncertainty in the average wheel velocity and an uncertainty in the differential wheel velocity. The method further includes solving a first set of equations to determine a longitudinal motion of the vehicle and a second set of equations to determine a yaw motion of the vehicle. A solution to the second set of equations is used a constraint at the first set of equations. The method further includes optimizing a first cost function to determine the average gain and a second cost function to determine the differential gain. The method further includes determining the estimate of the wheel velocity and the uncertainty in the wheel velocity using a moment of inertia of the wheel.

In another exemplary embodiment, a system for modeling and controlling a traction of a wheel of a vehicle is disclosed. The system includes an observer, a predictive controller and an online solver. The observer receives a dynamic model parameter of the wheel and determines an estimate of a wheel velocity and an uncertainty in the wheel velocity using a non-linear model of the wheel. The predictive controller determines an average gain and a differential gain from the estimate of the wheel velocity and the uncertainty in the wheel velocity. The online solver calculates a motor torque and a wheel brake torque for increasing the traction of the wheel with a road based on the average gain and the differential gain.

In addition to one or more of the features described herein, the wheel brake torque includes a right front brake torque and a left front brake torque. The estimate of the wheel velocity and the uncertainty in the wheel velocity includes an estimate of an average wheel velocity, an estimate of a differential wheel velocity, an uncertainty in the average wheel velocity and an uncertainty in the differential wheel velocity. The predictive controller generates a first cost function based on the estimate of the average wheel velocity and the uncertainty in the average wheel velocity and a second cost function based on the estimate of the differential wheel velocity and the uncertainty in the differential wheel velocity, and the online solver optimizes the first cost function to determine the average gain and optimizes the second cost function to determine the differential gain. The online solver solves a first set of equations to determine a longitudinal motion of the vehicle and a second set of equations to determine a yaw motion of the vehicle. A solution to the second set of equations is used a constraint at the first set of equations. The observer determines the estimate of the wheel velocity and the uncertainty in the wheel velocity using a moment of inertia of the wheel.

In yet another exemplary embodiment, a vehicle is disclosed. The vehicle includes an observer, a predictive controller and an online solver. The observer receives a dynamic model parameter of a wheel of the vehicle and determines an estimate of a wheel velocity and an uncertainty in the wheel velocity using a non-linear model of the wheel. The predictive controller determines an average gain and a differential gain from the estimate of the wheel velocity and the uncertainty in the wheel velocity. The online solver calculates a motor torque and a wheel brake torque for increasing a traction of the wheel with a road based on the average gain and the differential gain.

In addition to one or more of the features described herein, the wheel brake torque includes a right front brake torque and a left front brake torque. The estimate of the wheel velocity and the uncertainty in the wheel velocity includes an estimate of an average wheel velocity, an estimate of a differential wheel velocity, an uncertainty in the average wheel velocity and an uncertainty in the differential wheel velocity. The predictive controller generates a first cost function based on the estimate of the average wheel velocity and the uncertainty in the average wheel velocity and a second cost function based on the estimate of the differential wheel velocity and the uncertainty in the differential wheel velocity, and the online solver optimizes the first cost function to determine the average gain and optimizes the second cost function to determine the differential gain. The online solver solves a first set of equations to determine a longitudinal motion of the vehicle and a second set of equations to determine a yaw motion of the vehicle. A solution to the second set of equations is used a constraint at the first set of equations.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
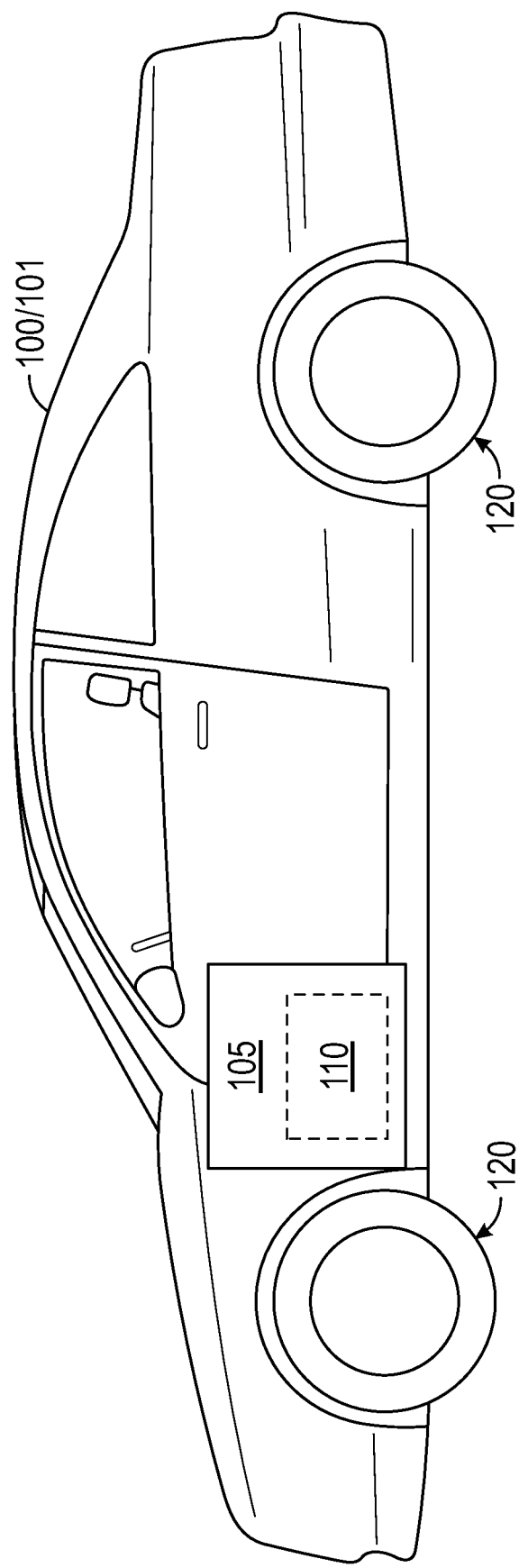
FIG. 1 is a block diagram of a vehicle with a traction control system, in an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 is a block diagram of a vehicle 100 with a traction control system 110. The exemplary vehicle 100 shown in FIG. 1 is an automobile 101. Two of the four wheels 120 of the vehicle 100 are visible according to the view shown in FIG. 1. The traction control system 110 uses a nonlinear dynamic model of a wheel 120 in order to determine torques to be applied to the wheel in order to increase traction of the wheel to the ground. The traction control system 110 is shown as being part of a controller 105 (e.g., electronic control unit (ECU)) of the vehicle 100. According to alternate embodiments, the functionality of the traction control system 110 can be separate from the controller 105 or can be performed by a set of controllers 105. The controller 105 operates various modules for implementing the traction control system 110.

Figure 2:
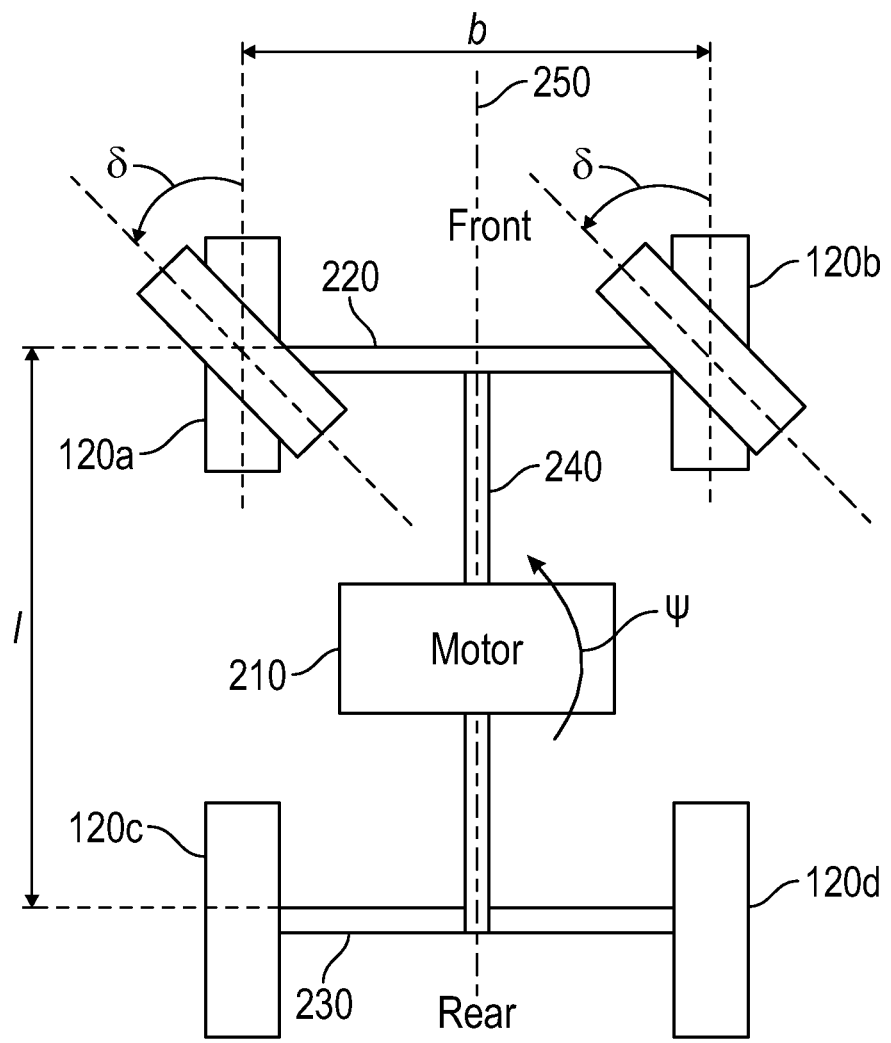
FIG. 2 shows a plan view of a chassis of the vehicle of FIG. 1 showing various components used for motion of the vehicle.

FIG. 2 shows a plan view of a chassis 200 of the vehicle 100 of FIG. 1, showing various components used for motion of the vehicle. The chassis 200 includes a front axle 220, a rear axle 230, and a drive shaft 240 connecting the rear axle 230 to the front axle 220. The drive shaft 240 provides a mechanism by which a force or torque can be transmitted between the rear axle 230 and the front axle 220. The drive shaft 240 is aligned along a longitudinal axis 250 of the vehicle 100. The front axle 220 supports a left front wheel 120a and a right front wheel 120b. The rear axle 230 supports a left rear wheel 120c and a right rear wheel 120d. Wheelbase l indicates a distance between the front axle 220 and the rear axle 230. Axle track b indicates a distance between left and right wheels.

A motor 210 provides a motor torque to the drive shaft 240 which is thereby transmitted to the rear axle 230 and the front axle 220 in order to rotate the wheels 120a-120d. The left front wheel 120a and right front wheel 120b are capable of changing their rolling directions from side to side to form a steering angle δ with respect to the longitudinal axis 250. During longitudinal motion with a non-zero steering angle, the vehicle 100 undergoes a yaw rotation, indicated in FIG. 2 as yaw rate ψ.

Figure 3:
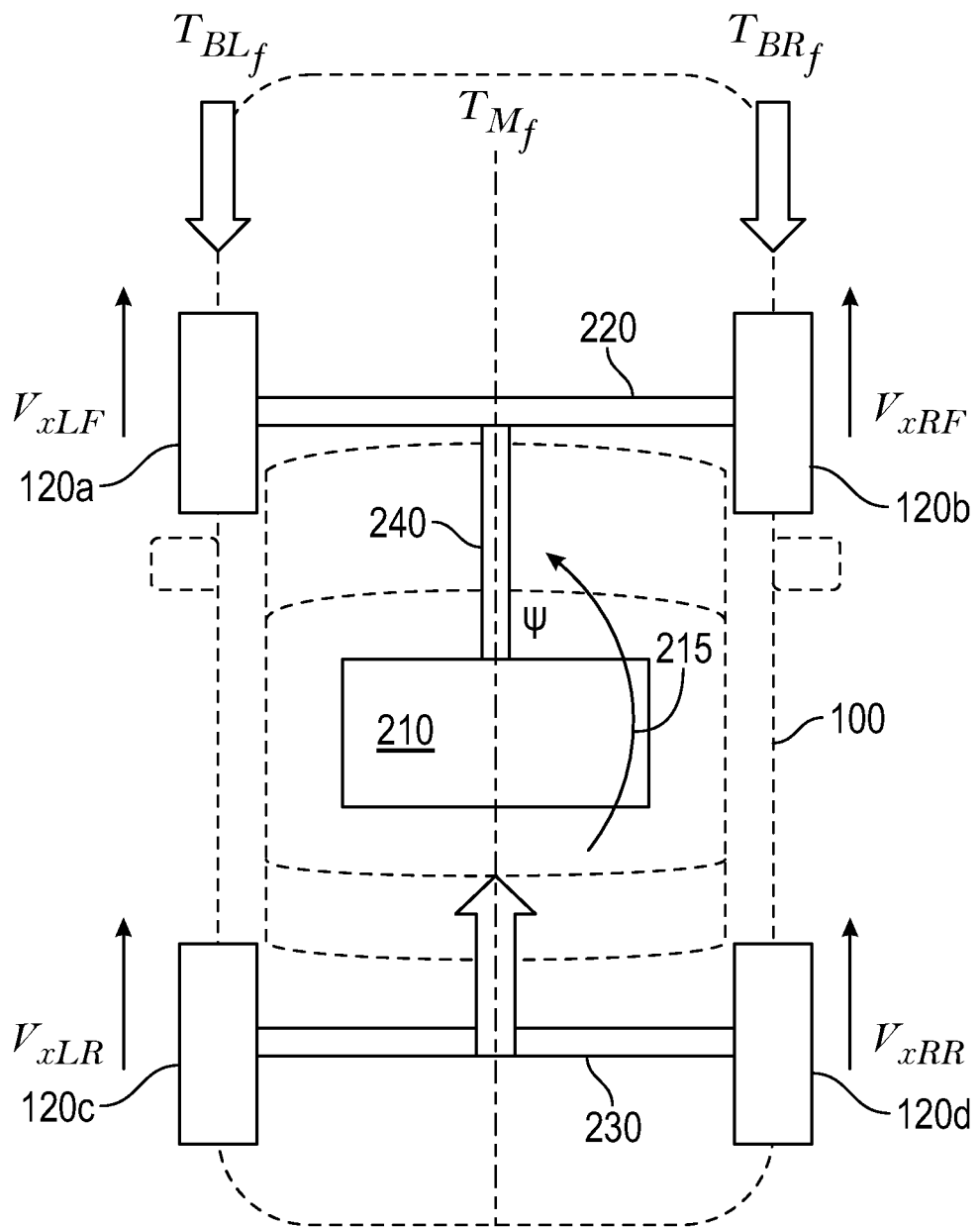
FIG. 3 show the chassis of FIG. 2, with associated dynamic model parameters labelled thereon.

FIG. 3 show the chassis 200 of FIG. 2, with associated dynamic model parameters labelled thereon. At the front axle 220, the left front wheel 120a has a longitudinal velocity of $V_{xLF}$ and right front wheel 120b has longitudinal velocity of $V_{xRF}$. At the rear axle 230, the left rear wheel 120c has a longitudinal velocity of $V_{xLR}$ and the right rear wheel 120d has a longitudinal velocity of $V_{xRR}$. The motor 210 provides a motor torque $T_{M_f}$ that is transmitted to the four wheels 120a-120d via the front axle 220, rear axle 230 and the drive shaft 240. A left front brake (not shown) can be activated to apply a left brake torque $T_{BL_f}$ to the left front wheel 120a and a right front brake (not shown) can be activated to apply a right brake torque $T_{BR_f}$ to the right front wheel 120b. In various embodiments, sensors (not shown) on the vehicle 100 obtain measurements of the various torques (i.e., motor torque $T_{M_f}$, left brake torque $T_{BL_f}$ and right brake torque $T_{BR_f}$) as well as the various dynamic model parameters of one or more of the wheels 120a-120d (e.g., $V_{xLF}$, $V_{xRF}$, $V_{xLR}$, $V_{xRR}$, etc.) in order to calculate values of traction control torques to be applied to reduce a wheel slip.

Figure 4:
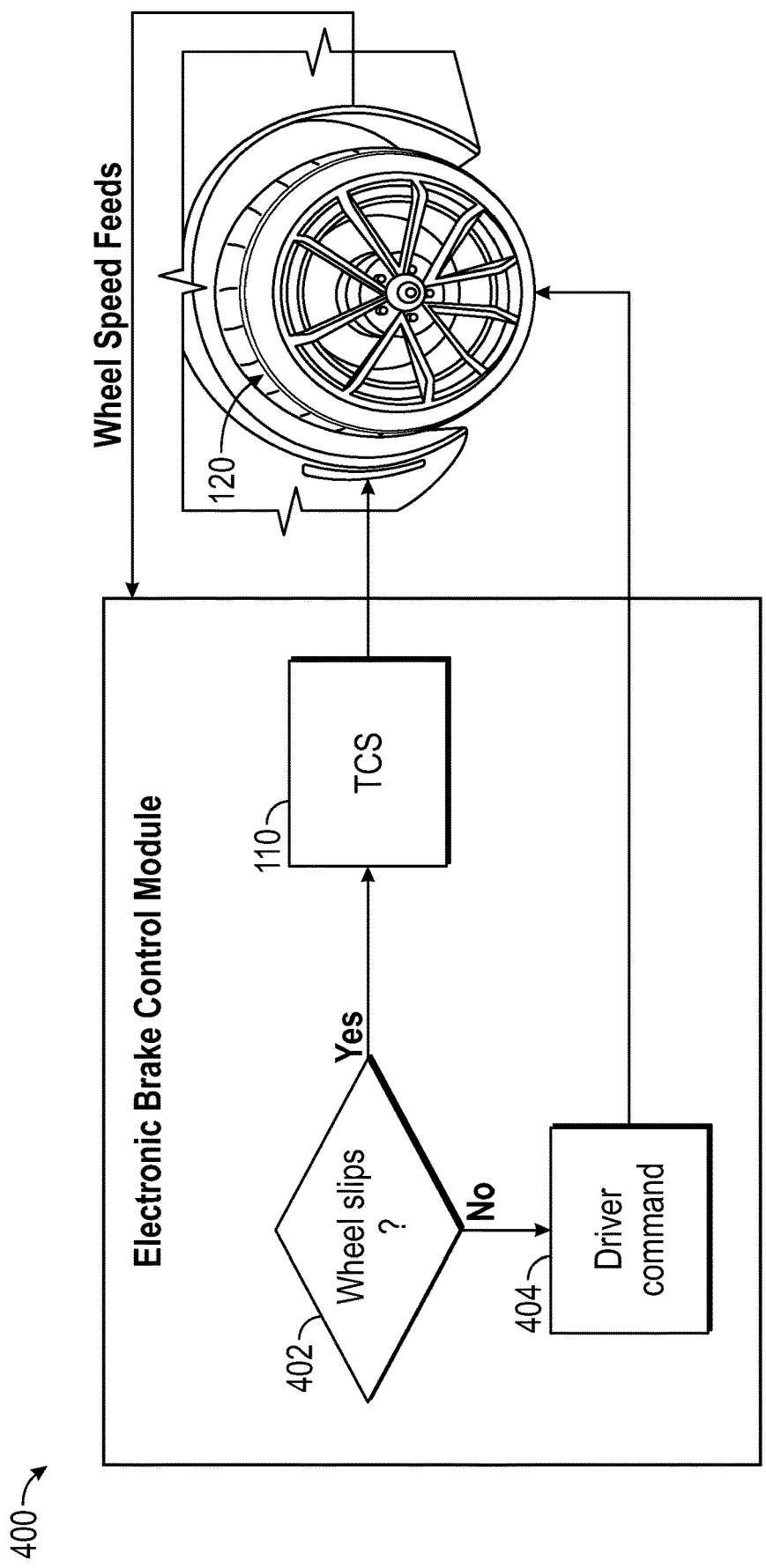
FIG. 4 shows a process flow for an electronic brake control module of the vehicle, in an embodiment.

FIG. 4 shows a process flow for an electronic brake control module 400 of the vehicle 100, in an embodiment. Sensors on the wheel 120 provide kinematic parameters to the electronic brake control module 400 including wheel speeds. At decision box 402, calculations are performed using the kinematic parameters to determine whether the wheel 120 is undergoing wheel slip. If wheel slip is not present, the electronic brake control module 400 allows a driver command 404 to control the operation of the wheel 120. On the other hand, if wheel slip is present, the electronic brake control module 400 employs the traction control system 110 to reduce or eliminate wheel slip.

Figure 5:
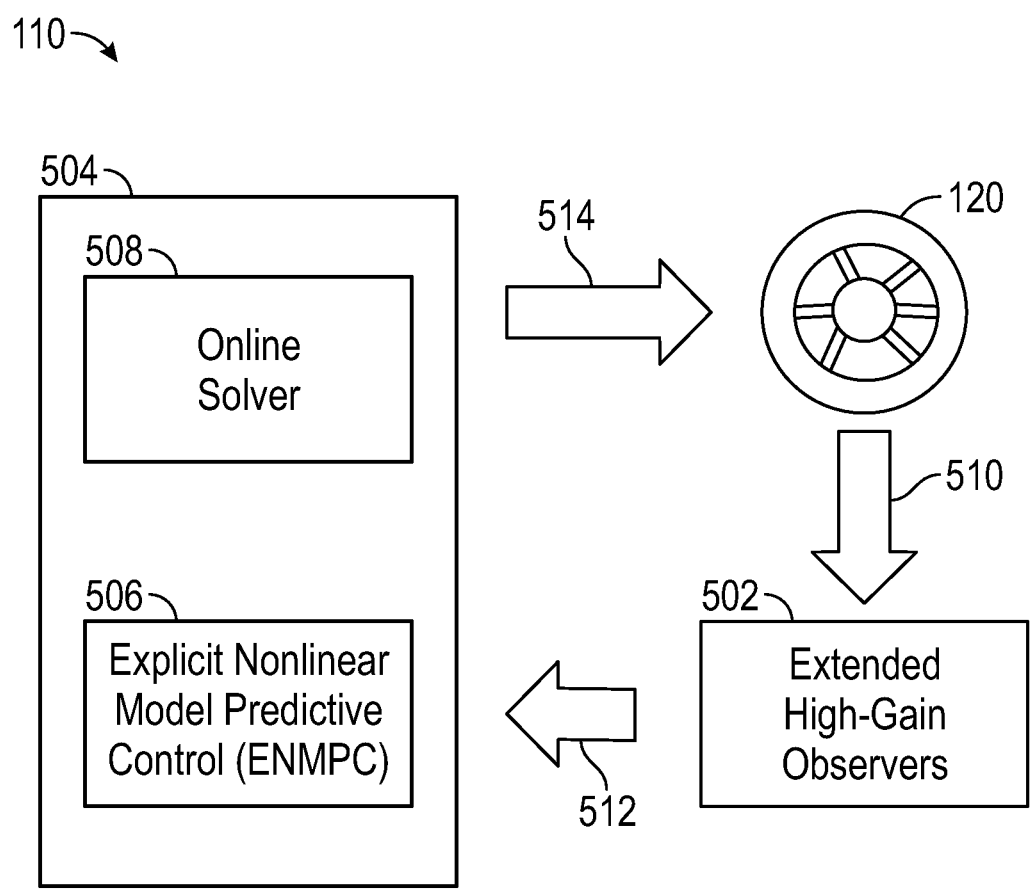
FIG. 5 is a schematic diagram showing operation of the traction control system.

FIG. 5 is a schematic diagram showing operation of the traction control system 110. The traction control system 110 includes a high gain observer 502 and a feedback controller 504. The feedback controller 504 includes a non-linear model predictive controller, also referred to herein as a predictive controller 506, and an online solver 508.

Sensors at the wheel provide kinematic parameters 510 to the high gain observer 502. The high gain observer 502 calculates various estimates 512 of dynamic model parameters and uncertainties based on a non-linear model of the kinematic parameters 510. These estimates 512 of dynamic model parameters and uncertainties are provided to the predictive controller 506 of the feedback controller 504. The predictive controller 506 generates one or more cost functions from the estimates 512 and uncertainties and optimizes the one or more cost functions to determine various gains for controlling subsequent applied torques. The gains are provided from the predictive controller 506 to the online solver 508. The online solver 508 determines various torques ($T_{M_f}$, $T_{BL_f}$, $T_{BR_f}$) 514 to be supplied to the vehicle 100 in order to reduce wheel slippage at the wheel 120.

A discussion of the kinematic parameters 510 that are supplied from the wheel sensors to the high gain observer 502 is now presented. Kinematic equations relating the longitudinal velocity of the rear axle 230 ($V_{x\,rear}$) to wheel dynamics at each of the wheels 120a-120d are shown in Eqs. (1)-(4):

$$V_{x\,rear\,LF} = \frac{r\omega_{LF}}{\cos\delta} - \dot{\psi} l\tan\delta + \dot{\psi}\frac{b}{2} \qquad \text{Eq. (1)}$$

$$V_{x\,rear\,RF} = \frac{r\omega_{RF}}{\cos\delta} - \dot{\psi} l\tan\delta - \dot{\psi}\frac{b}{2} \qquad \text{Eq. (2)}$$

$$V_{x\,rear\,LR} = r\omega_{LR} + \dot{\psi}\frac{b}{2} \qquad \text{Eq. (3)}$$

$$V_{x\,rear\,RR} = r\omega_{RR} - \dot{\psi}\frac{b}{2} \qquad \text{Eq. (4)}$$

where the index LF indicates left front wheel 120a, the index RF indicates right front wheel 120b, the index LR indicates left rear wheel 120c, and the index RR indicates right rear wheel 120d. The parameter r is a radius of the wheel, l is wheelbase, b is axle track and $\dot{\psi}$ is a yaw rate of the vehicle. An average front wheel velocity $V_{avg_f}$ is therefore given by Eq. (5):

$$V_{avg_f} = (V_{x\,rear\,LF} + V_{x\,rear\,RF})/2 \qquad \text{Eq. (5)}$$

and a difference in front wheel velocities $V_{diff_f}$ is given by Eq. (6):

$$V_{diff_f} = V_{x\,rear\,LF} - V_{x\,rear\,RF} \qquad \text{Eq. (6)}$$

Equations similar to Eq. (5) and Eq. (6) can be generated to determine an average rear wheel velocity $V_{avg_r}$ and a difference in rear wheel velocities $V_{diff_r}$.

In operation, the observer 502 receives the various kinematic parameters 510 from the sensors at the wheel 120, including, but not limited to, the average front wheel velocity $V_{avg_f}$, the difference in front wheel velocities $V_{diff_f}$, and the current torques on the vehicle, such as the forward motor torque $T_{M_f}$, left front brake torque $T_{BL_f}$ and right front brake torque $T_{BR_f}$. The observer 502 also receives or has access to state parameters such as the steering angle $\delta$, the steering rate S, the wheelbase l, axle track b, etc. The observer 502 performs calculations on the dynamic model parameters to generate estimated values of the dynamic model parameters of the wheel, such as an estimate $\hat{V}_{avg_f}$ of average front wheel velocities and an estimate $\hat{V}_{diff_f}$ of a difference between front wheel velocities, as well as associated uncertainties (i.e., $\hat{\sigma}_{avg_f}$ and $\hat{\sigma}_{diff_f}$ respectively). Calculations performed at the observer 502 are detailed in Eqs. (7)-(14).

Eq. (7) shows a dynamic model equation for a time derivative of the average front wheel velocity:

$$\dot{V}_{avg_f} = \left(\frac{r}{2J_f \cos\delta}\right)(T_{M_f} + T_{BL_f} + T_{BR_f}) + \qquad \text{Eq. (7)}$$
$$\left(\frac{r}{2J_f \cos\delta}\right)[F_{xL_f} + F_{xR_f}] + V_{avg_f}(\delta\tan\delta) +$$
$$2\delta[l\tan^2\delta - l\sec^2\delta]\dot{\psi} - (l\tan\delta)\ddot{\psi} + \sigma_{avg_f}$$

where $J_f$ is wheel inertia and $F_{xL_f}$ and $F_{xR_f}$ are longitudinal forces on the left front wheel and right front wheel, respectively. Eq. (7) further includes an uncertainty term $\sigma_{avg\_f}$ which is an unknown tire interaction term which accounts for uncertainties in the values of the state parameters and dynamic model parameters. Eq. (7) does not provide a complete description of longitudinal vehicle movement. Additionally, several parameters of Eq. (7) cannot be measured. Therefore, the observer 502 instead implements Eqs. (8) and (9) to include the effects to due to missing or unmeasured parameters.

The observer 502 determines an estimate of average front wheel velocity and uncertainties in the wheel dynamic model shown in Eq. (8) and (9):

$$\dot{\hat{V}}_{avg_f} = \left(\frac{r}{2J_f \cos\delta}\right)(T_{M_f} + T_{BL_f} + T_{BR_f}) + \hat{\sigma}_{avg_f} + \qquad \text{Eq. (8)}$$
$$\delta l[\tan^2\delta - \sec^2\delta]\dot{\psi} - (l\tan\delta)\ddot{\psi} + \left(\frac{h_1}{\varepsilon}\right)(V_{avg_f} - \hat{V}_{avg_f})$$

$$\dot{\hat{\sigma}}_{avg_f} = \left(\frac{h_2}{\varepsilon^2}\right)(V_{avg_f} - \hat{V}_{avg_f}) \qquad \text{Eq. (9)}$$

Eq. (9) is an equation of time evolution for the uncertainty in average velocity. Eq. (8) describes a time evolution of an estimate of average velocity, while Eq. (9) describes a time evolution of the missing and/or unmeasured parameters. In Eqs. (8) and (9), $h_1$ and $h_2$ are observer gains and c is a small positive constant value ($0<\varepsilon\ll 1$). The observer gains $h_1$ and $h_2$ are chosen such that the polynomial of Eq. (10):

$$s^2 + h_1 s + h_2 = 0 \qquad \text{Eq. (10)}$$

is Hurwitz. The ordinary differential equations shown in Eqs. (8) and (9) can be solved to produce outputs $\hat{V}_{avg_f}$ and $\hat{\sigma}_{avg_f}$.

Similarly, an equation of motion for the difference in front wheel velocities is shown in Eq. (11):

$$\dot{V}_{diff_f} = \left(\frac{r}{J_f \cos\delta}\right)(T_{BL_f} - T_{BR_f}) - \left(\frac{r^2}{J_f \cos\delta}\right)[F_{xL_f} - F_{xR_f}] + \qquad \text{Eq. (11)}$$
$$V_{diff_f}(\delta\tan\delta) - (b\dot{\delta}\tan\delta)\dot{\psi} + b\ddot{\psi} + \sigma_{diff_f}$$

where $J_f$ is wheel inertia and $F_{xL_f}$ and $F_{xR_f}$ are longitudinal forces on the left front wheel and right front wheel, respectively. Uncertainty term $\sigma_{diff_f}$ is an unknown tire interaction term which accounts for uncertainties in the values of the state parameters and dynamic model parameters.

The observer 502 solves the equation for the estimate of difference in front wheel velocities shown in Eq. (12) and (13):

$$\dot{\hat{V}}_{diff_f} = \left(\frac{r}{J_f \cos\delta}\right)(T_{BL_f} - T_{BR_f}) + V_{diff_f}(\delta\tan\delta) - \qquad \text{Eq. (12)}$$
$$(b\dot{\delta}\tan\delta)\omega + b\dot{\omega} + \hat{\sigma}_{diff_f} + \left(\frac{h_3}{\varepsilon}\right)(V_{diff_f} - \hat{V}_{diff_f})$$

$$\dot{\hat{\sigma}}_{diff_f} = \left(\frac{h_4}{\varepsilon^2}\right)(V_{diff_f} - \hat{V}_{diff_f}) \qquad \text{Eq. (13)}$$

Eq. (13) is a time evolution equation for the uncertainty in differential velocity. Eq. (12) describes a time evolution of an estimate of differential velocity, while Eq. (13) describes a time evolution of the missing and/or unmeasured parameters. In Eqns. (12) and (13), $h_3$ and $h_4$ are observer gains and c is a small positive constant value ($0<\varepsilon\ll 1$). The observer gains $h_3$ and $h_4$ are chosen such that the polynomial of Eq. (14):

$$s^2 + h_3 s + h_4 = 0 \qquad \text{Eq. (14)}$$

is Hurwitz. The ordinary differential equations shown in Eqns. (12) and (13) can be solved to produce outputs $\hat{V}_{diff}$ and $\hat{\sigma}_{diff}$.

A discussion of operation of the predictive controller 506 is now presented. The predictive controller 506 calculates gain values using two separate models. The first model is an average dynamic model which describes a vehicle's longitudinal motion and generates an average gain value. The second model is a difference dynamic model that describes a yaw rotation of the vehicle and generates a differential gain value.

The first model involves creation of a first cost function based on summation of torques, which is represented by $\bar{u}$ in Eq. (15):

$$\bar{u} = T_M + T_{BL_f} + T_{BR_f} \qquad \text{Eq. (15)}$$

An illustrative cost function describing the dynamics of the average forces on the wheel is given in Eq. 16):

$$J_{avg} = \int_0^T \left[ V_{avg_f} - V_{avg_r} \quad \dot{V}_{avg_f}(V_{avg_f}, \bar{u}) - \dot{V}_{avg_r} \right] \begin{bmatrix} 1 & \tau \\ \tau & \tau^2 \end{bmatrix} \qquad \text{Eq. (16)}$$

$$\begin{bmatrix} V_{avg_f} - V_{avg_r} \\ \dot{V}_{avg_f}(V_{avg_f}, \bar{u}) - \dot{V}_{avg_r} \end{bmatrix} d\tau =$$

$$\left[ V_{avg_f} - V_{avg_r} \quad \dot{V}_{avg_f}(V_{avg_f}, \bar{u}) - \dot{V}_{avg\,r} \right]$$

$$\begin{bmatrix} \int_0^T 1\, d\tau & \int_0^T \tau\, d\tau \\ \int_0^T \tau\, d\tau & \int_0^T \tau^2\, d\tau \end{bmatrix}$$

$$\begin{bmatrix} V_{avg_f} - V_{avg_r} \\ \dot{V}_{avg_f}(V_{avg_f}, \bar{u}) - \dot{V}_{avg_r} \end{bmatrix} =$$

$$\left[ V_{avg_f} - V_{avg_r} \quad \dot{V}_{avg_f}(V_{avg_f}, \bar{u}) - \dot{V}_{avg_r} \right]$$

$$\begin{bmatrix} T & \frac{T^2}{2} \\ \frac{T^2}{2} & \frac{T^3}{3} \end{bmatrix} \begin{bmatrix} V_{avg_f} - V_{avg_r} \\ \dot{V}_{avg_f}(V_{avg_f}, \bar{u}) - \dot{V}_{avg_r} \end{bmatrix}$$

The cost function is optimized by taking a derivative of Eq. (16) with respect to $\bar{u}$ and setting the derivative to zero, as shown in Eq. (17):

$$\frac{\partial J_{avg}}{\partial \bar{u}} = \begin{bmatrix} 0 & \frac{\partial \dot{V}_{avg_f}}{\partial \bar{u}} \end{bmatrix} \begin{bmatrix} T & \frac{T^2}{2} \\ \frac{T^2}{2} & \frac{T^3}{3} \end{bmatrix} \begin{bmatrix} V_{avg_f} - V_{avg_r} \\ \dot{V}_{avg_f}(V_{avg_f}, \bar{u}) - \dot{V}_{avg_r} \end{bmatrix} = 0 \qquad \text{Eq. (17)}$$

Eq. (17) can be simplified to obtain Eq. (18):

$$\frac{\partial J_{avg}}{\partial \bar{u}} = \left(\frac{\partial \dot{V}_{avg_f}}{\partial \bar{u}}\right) \left[\left(\frac{T^2}{2}\right)\left(\frac{3}{T^3}\right)\right] \qquad \text{Eq. (18)}$$

$$(V_{avg_f} - V_{avg_r})(\dot{V}_{avg_f}(V_{avg_f}, \bar{u}) - \dot{V}_{avg_r}) = 0$$

By defining the average gain $k_{avg}$ as shown in Eq. (19):

$$k_{avg} = \left(\frac{T^2}{2}\right)\left(\frac{3}{T^3}\right) \qquad \text{Eq. (19)}$$

the average gain $k_{avg}$ can be determined by solving Eq. (18).

The second model involves creation of a second cost function based on a difference in left front wheel torque and right front wheel torque, which is represented by $u$ in Eq. (15):

$$u = T_{BL_f} - T_{BR_f} \qquad \text{Eq. (20)}$$

The results of the calculations are similar to the calculates in Eqns. (16)-(19) and resulting in differential gain $k_{diff}$, as shown in Eq. (21):

$$k_{diff} = \left(\frac{T^2}{2}\right)\left(\frac{3}{T^3}\right) \qquad \text{Eq. (20)}$$

where T is called a time horizon. The gains $k_{avg}$ and $k_{diff}$ are then provided from the predictive controller 506 to the online solver 508.

A discussion of operation of the online solver 508 is now presented. The online solver 508 performs calculations using parameters from the observer 502 and from the predictive controller 506. The online solver 508 solves a first set of equations to determine an average force to be applied to determine a value for a summation of torques, as expressed in Eq. (15).

The first set of equations are discussed in Eqs. (21)-(24). An average wheel force function $\phi_{avg_f}$ is created from a difference in an average of the front wheel forces and an average of the rear wheel forces, as shown in Eq. (21):

$$\phi_{avg_f} = -(f_{avg_f} - f_{avg_r}) \qquad \text{Eq. (21)}$$

where the average front wheel forces are given in Eq. (22):

$$f_{avg_f} = \left(\frac{r}{2J_f \cos \delta}\right) \bar{u} + V_{avg_f} \dot{\delta} \tan \delta - (b\dot{\delta} \tan \delta)\psi + \qquad \text{Eq. (22)}$$

$$\hat{\sigma}_{avg\,f} + \dot{\delta}l[\tan^2 \delta - \sec^2 \delta]\psi - 2\dot{\psi}(l \tan \delta)$$

and the average rear wheel forces are given in Eq. (23):

$$f_{avg_r} = -k_{avg}(V_{avg_f} - V_{avg_r}) + \dot{V}_{avg_r} \qquad \text{Eq. (23)}$$

A time derivative of the summation of torques is defined by the average wheel force function using Eq. (24):

$$\dot{\bar{u}} = Proj[\phi_{avg_f}] = \begin{cases} \phi_{avg_f} & \text{if } \begin{cases} a_1 < \bar{u} < b_1 \\ \text{or} \\ \bar{u} > b_1 \text{ and } \phi_{avg_f} \leq 0 \\ \text{or} \\ \bar{u} \leq a_1 \text{ and } \phi_{avg_f} \geq 0 \end{cases} \\ \left(1 + \frac{b_1 - \bar{u}}{\delta_a}\right)\phi_{avg_f} & \text{if } \bar{u} \geq b_1 \text{ and } \phi_{avg_f} \geq 0 \\ \left(1 + \frac{\bar{u} - a_1}{\delta_a}\right)\phi_{avg_f} & \text{if } \bar{u} \leq a_1 \text{ and } \phi_{avg_f} \leq 0 \end{cases} \qquad \text{Eq. (24)}$$

where $a_1$ and $b_1$ are lower and upper values, respectively, for an actuator's capacity, and the control parameter $\delta_a$ is selected to having the following condition: $0 < \delta_a \ll 1$. The online solver solves Eq. (24) to determine $\bar{u}$.

The second set of equations are discussed in Eqns. (25)-(29). A different wheel force function $\phi_{diff_f}$ is created from a differential front wheel force and a differential rear wheel force, as shown in Eq. (25):

$$\phi_{diff_f} = (f_{diff_f} - f_{diff_r}) \qquad \text{Eq. (25)}$$

where the differential front wheel forces are given in Eq. (26):

$$f_{diff_f} = \left(\frac{r}{J_f \cos \delta}\right) u + V_{diff_f} \delta \tan \delta + \dot{\sigma}_{avg_f} - \psi b \delta \tan \delta + b \dot{\psi} \qquad \text{Eq. (26)}$$

and the differential rear wheel forces are given in Eq. (27):

$$f_{diff_r} = -k_{diff}(V_{diff_f} - V_{diff_r}) \dot{V}_{diff_r} \qquad \text{Eq. (27)}$$

A time derivative of the difference in torque is defined by the difference wheel force function using Eq. (28):

$$\dot{u} = Proj[\phi_{diff_f}] = \begin{cases} \phi_{diff_f} & \text{if } \begin{cases} a_2 < u < b_2 \\ \text{or} \\ u > b_2 \text{ and } \phi_{diff_f} \leq 0 \\ \text{or} \\ u \leq a_2 \text{ and } \phi_{diff_f} \geq 0 \end{cases} \\ \left(1 + \frac{b_2 - u}{\delta_d}\right) \phi_{diff_f} & \text{if } u \geq b_2 \text{ and } \phi_{diff_f} \geq 0 \\ \left(1 + \frac{u - a_2}{\delta_d}\right) \phi_{diff_f} & \text{if } u \leq a_2 \text{ and } \phi_{diff_f} \leq 0 \end{cases} \qquad \text{Eq. (28)}$$

where $a_2$ and $b_2$ are lower and upper values, respectively for an actuator's capacity and the control parameter $\delta_d$ is selected under the condition shown in the following equation: $0 < \delta_d \ll 1$. The online solver solves Eq. (28) to determine u.

In various embodiments, the second set of equations in Eqns. (25)-(29) can be solved first and the results used to form a construction on solutions to the first set of equations (Eqns. (21)-(24)). When $\bar{u} > 0$ or $s_f \leq \bar{u} < 0$, then $T_{M_f} = \bar{u}$ and $T_{BL_f}$ and $T_{BR_f}$ are chosen. When $\bar{u} < s_f < 0$, then $T_{M_f} = s_f$ and $T_{BL_f}$ and $T_{BR_f}$ are chosen. The parameter $s_f$ is a control parameter that can be selected or set by a designer based on a capability of the motor. The value of $s_f$ can be set to $-10$ in various embodiments.

Figure 6:
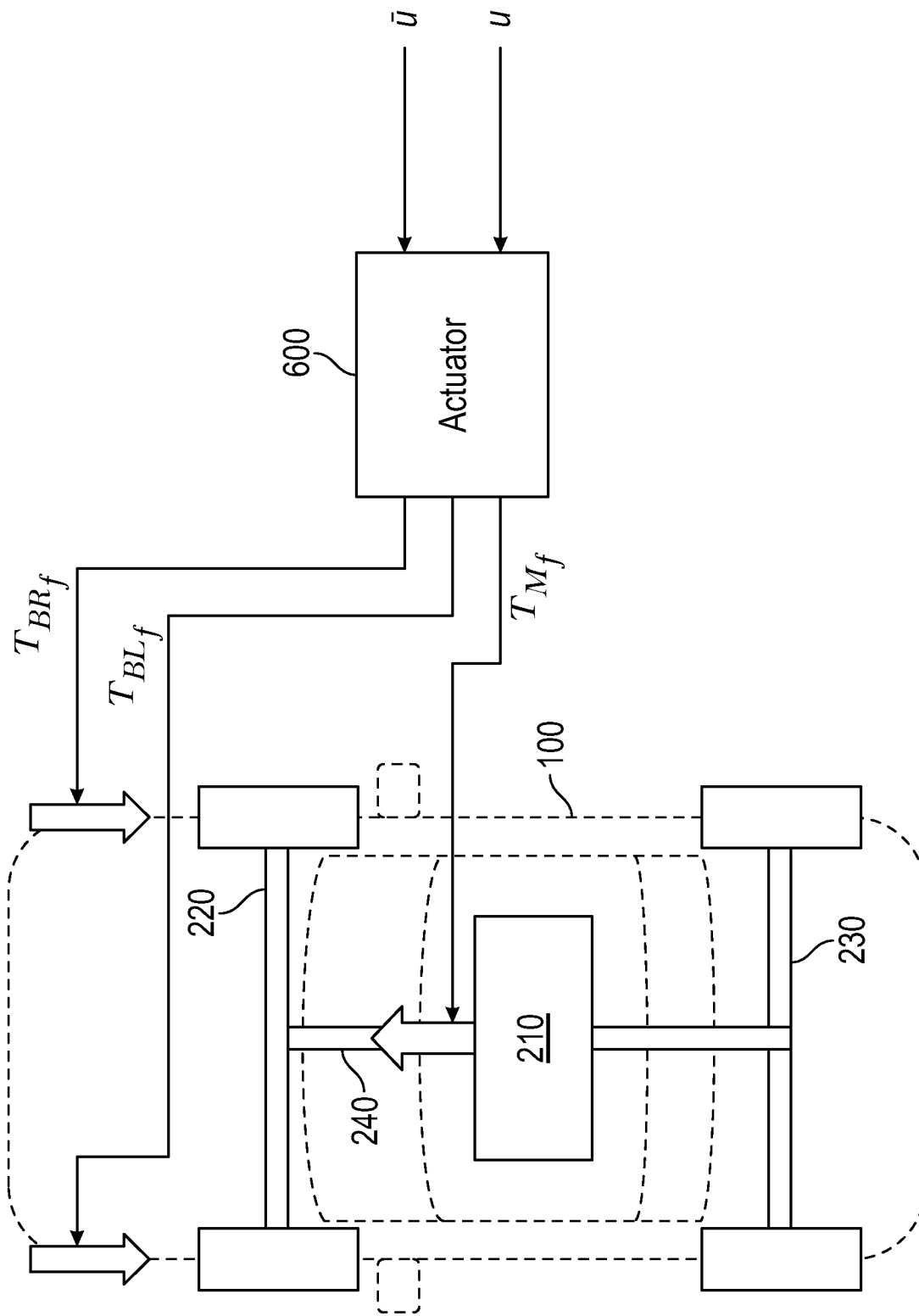
FIG. 6 shows an actuator for distributing the torques to the vehicle.

FIG. 6 shows an actuator 600 for distributing the torques to the vehicle 100. The actuator 600 receives the results of the calculations (i.e., $\bar{u}$ and u from the online solver 508) and calculates the forward motor torque $T_{Mf}$, left front brake torque $T_{BLf}$ and right front brake torque $T_{BRf}$ and applies these torques at the vehicle.

Figure 7:
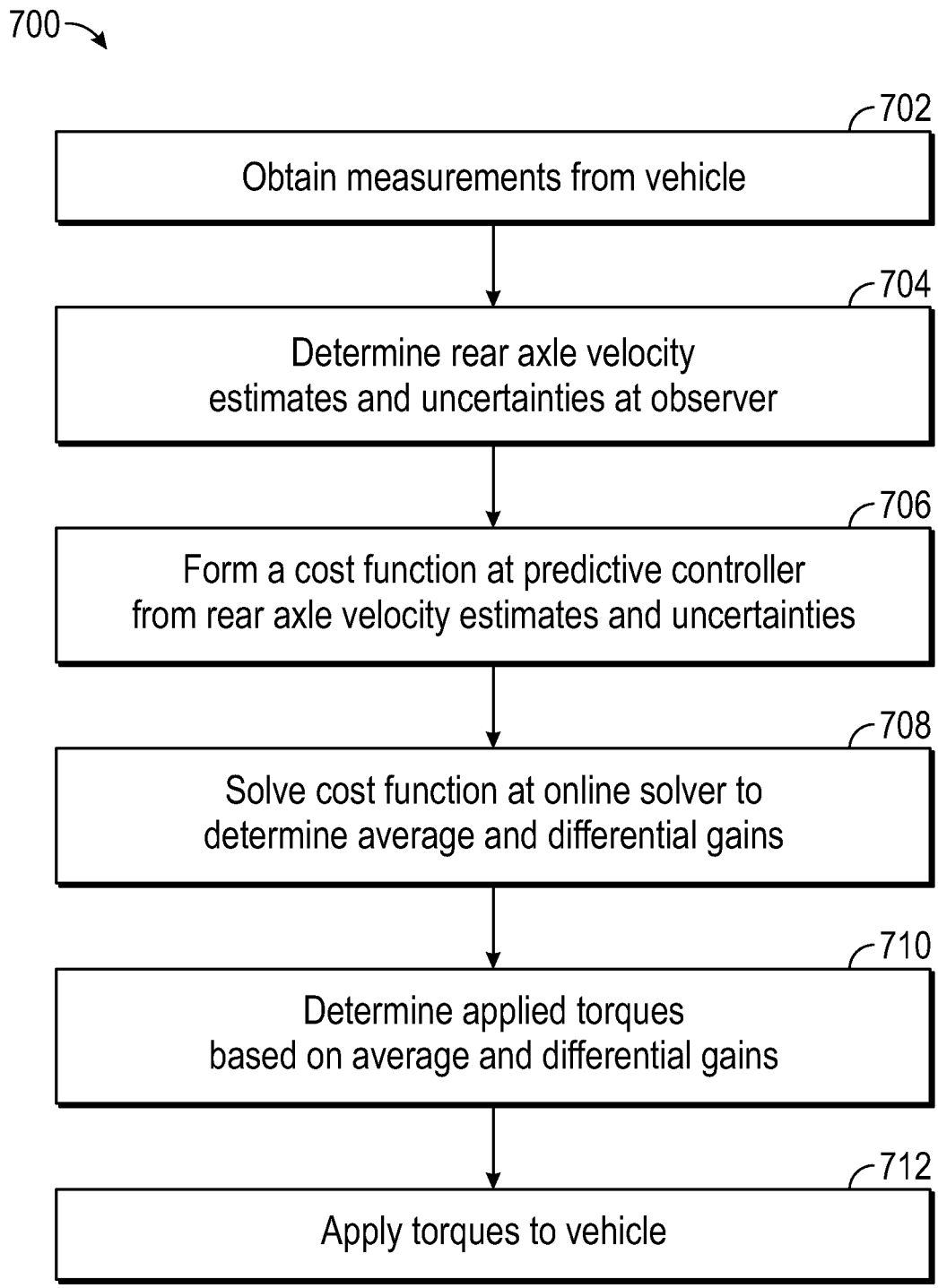
FIG. 7 shows a flowchart of a method for traction control using the methods disclosed herein.

FIG. 7 shows a flowchart 700 of a method for traction control using the methods disclosed herein. In box 702, measurements are obtained of the wheel dynamics using sensors at the vehicle. In box 704, rear axle velocity estimates (average and differential) and related uncertainties are determined at the observer. In box 706, cost functions are formed at the predictive controller from the rear axle velocity estimates and uncertainties. In box 708, the cost functions are solved at the online solver to determine average and differential gains. In box 710, torques to be applied to the vehicle to increase wheel traction are determined using the average and differential gains. In box 712, the torques are applied to the vehicle.

Figure 8:
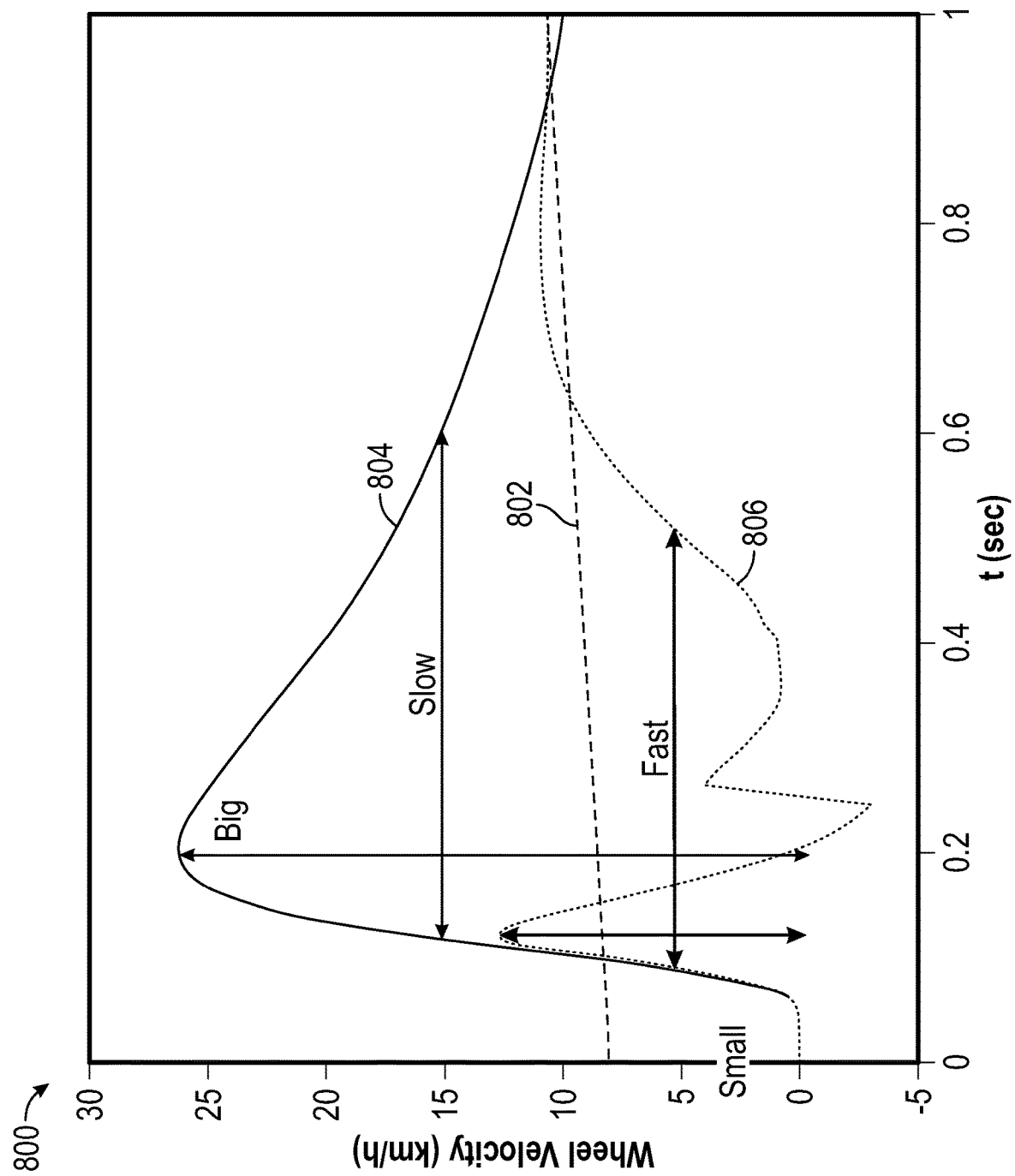
FIG. 8 shows a graph of left wheel velocities over time.

FIG. 8 shows a graph 800 of left wheel velocities over time. Time is shown along the abscissa in seconds and left wheel velocity is shown along the ordinate axis in kilometers per hour (km/h). Line 802 represents a target velocity for the left wheel. Curve 804 represents the left wheel velocity for a wheel which experiences wheel slip and which is controlled using a conventional liner traction control system. Curve 806 represents the left wheel velocity for a wheel which experiences wheel slip and which is controlled using the traction control system disclosed herein. Curve 804 exhibits a large variation in left wheel velocity (e.g., between about 0 km/h and about 27 km/h) as well as a long decay time (e.g., about 0.8 second) to achieve a wheel velocity that is in line with the target wheel velocity. Meanwhile curve 806 exhibits a relatively small variation in left wheel velocity (e.g., between about 0 km/h and about 12 km/h) as well as a shorter decay time (e.g., about 0.5 second) to achieve a wheel velocity that is in line with the target wheel velocity.

Figure 9:
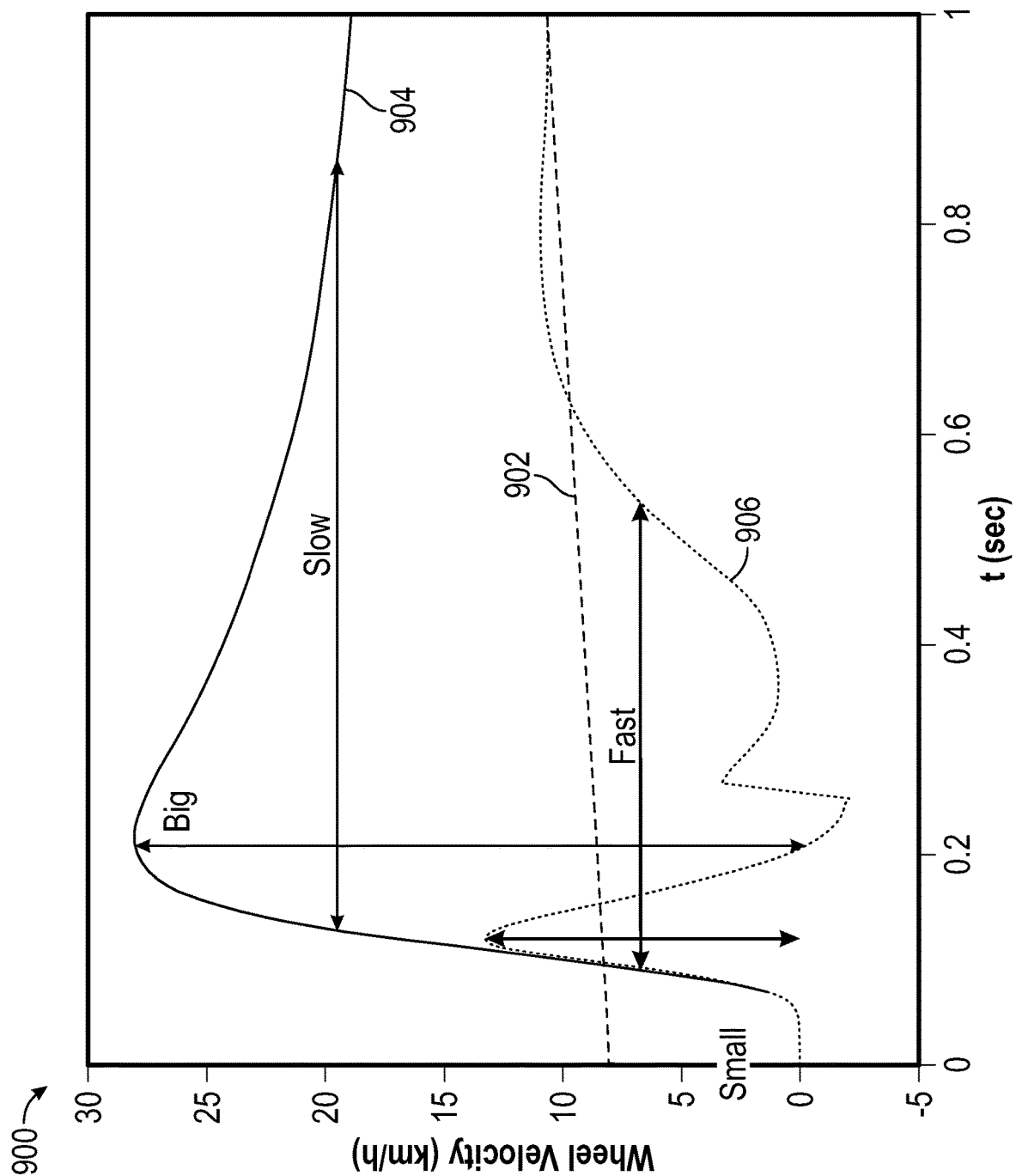
FIG. 9 shows a graph of right wheel velocities over time.

FIG. 9 shows a graph 900 of right wheel velocities over time. Time is shown along the abscissa in seconds and right wheel velocity is shown along the ordinate axis in kilometers per hour (km/h). Line 902 represents a target velocity for the right wheel. Curve 904 represents the right wheel velocity for a wheel which experiences wheel slip and which is controlled using a conventional linear traction control system. Curve 906 represents the right wheel velocity for a wheel which experiences wheel slip and which is controlled using the traction control system disclosed herein. Curve 904 exhibits a large variation in right wheel velocity (e.g., between about 0 km/h and about 27 km/h) as well as a long decay time (e.g., greater than a second) to achieve a wheel velocity that is in line with the target wheel velocity. Meanwhile curve 906 exhibits a relatively small variation in right wheel velocity (e.g., between about 0 km/h and about 12 km/h) as well as a shorter decay time (e.g., about 0.4 second) to achieve a wheel velocity that is in line with the target wheel velocity.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of modeling and controlling a traction of a wheel of a vehicle, comprising:
   receiving a dynamic model parameter of the wheel at; a processor;
   determining, at the processor, an estimate of a wheel velocity and an uncertainty in the wheel velocity using a non-linear model of the wheel;
   determining, at controller, the processor, an average gain and a differential gain from the estimate of the wheel velocity and the uncertainty in the wheel velocity;
   calculating, at the processor, a motor torque and a wheel brake torque for increasing the traction of the wheel with a road based on the average gain and the differential gain; and
   applying the motor torque and the wheel brake torque at the vehicle.

2. The method of claim 1, wherein the wheel brake torque includes a right front brake torque and a left front brake torque.

3. The method of claim 1, wherein the estimate of the wheel velocity and the uncertainty in the wheel velocity includes an estimate of an average wheel velocity, an estimate of a differential wheel velocity, an uncertainty in the average wheel velocity and an uncertainty in the differential wheel velocity.

4. The method of claim 1, further comprising solving a first set of equations to determine a longitudinal motion of the vehicle and a second set of equations to determine a yaw motion of the vehicle.

5. The method of claim 4, wherein a solution to the second set of equations is used as a constraint at the first set of equations.

6. The method of claim 1, further comprising optimizing a first cost function to determine the average gain and a second cost function to determine the differential gain.

7. The method of claim 1, further comprising determining the estimate of the wheel velocity and the uncertainty in the wheel velocity using a moment of inertia of the wheel.

8. A system for modeling and controlling a traction of a wheel of a vehicle, comprising:
a processor configured to:
receive a dynamic model parameter of the wheel and determining an estimate of a wheel velocity and an uncertainty in the wheel velocity using a non-linear model of the wheel;
determine an average gain and a differential gain from the estimate of the wheel velocity and the uncertainty in the wheel velocity; and
calculate a motor torque and a wheel brake torque for increasing the traction of the wheel with a road based on the average gain and the differential gain.

9. The system of claim 8, wherein the wheel brake torque includes a right front brake torque and a left front brake torque.

10. The system of claim 8, wherein the estimate of the wheel velocity and the uncertainty in the wheel velocity includes an estimate of an average wheel velocity, an estimate of a differential wheel velocity, an uncertainty in the average wheel velocity and an uncertainty in the differential wheel velocity.

11. The system of claim 10, wherein the processor is further configured to generate a first cost function based on the estimate of the average wheel velocity and the uncertainty in the average wheel velocity and a second cost function based on the estimate of the differential wheel velocity and the uncertainty in the differential wheel velocity, optimize the first cost function to determine the average gain, and optimize the second cost function to determine the differential gain.

12. The system of claim 8, wherein the processor is further configured to solve a first set of equations to determine a longitudinal motion of the vehicle and a second set of equations to determine a yaw motion of the vehicle.

13. The system of claim 12, wherein a solution to the second set of equations is used as a constraint at the first set of equations.

14. The system of claim 8, wherein the processor is further configured to determine the estimate of the wheel velocity and the uncertainty in the wheel velocity using a moment of inertia of the wheel.

15. A vehicle, comprising:
a processor configured to:
receive a dynamic model parameter of a wheel of the vehicle and determining an estimate of a wheel velocity and an uncertainty in the wheel velocity using a non-linear model of the wheel;
determine an average gain and a differential gain from the estimate of the wheel velocity and the uncertainty in the wheel velocity; and
calculate a motor torque and a wheel brake torque for increasing a traction of the wheel with a road based on the average gain and the differential gain.

16. The vehicle of claim 15, wherein the wheel brake torque includes a right front brake torque and a left front brake torque.

17. The vehicle of claim 15, wherein the estimate of the wheel velocity and the uncertainty in the wheel velocity includes an estimate of an average wheel velocity, an estimate of a differential wheel velocity, an uncertainty in the average wheel velocity and an uncertainty in the differential wheel velocity.

18. The vehicle of claim 17, wherein the processor is further configured to generate a first cost function based on the estimate of the average wheel velocity and the uncertainty in the average wheel velocity and a second cost function based on the estimate of the differential wheel velocity and the uncertainty in the differential wheel velocity, optimize the first cost function to determine the average gain, and optimize the second cost function to determine the differential gain.

19. The vehicle of claim 15, wherein the processor is further configured to solve a first set of equations to determine a longitudinal motion of the vehicle and a second set of equations to determine a yaw motion of the vehicle.

20. The vehicle of claim 19, wherein a solution to the second set of equations is used as a constraint at the first set of equations.

* * * * *